United States Patent [19]

Schmeidl

[11] Patent Number: 4,977,278
[45] Date of Patent: Dec. 11, 1990

[54] PREPARATION OF RHODAMINE DYES IN GRANULE FORM BY DIRECT COOLING

[75] Inventor: Karl Schmeidl, Gefrees, Fed. Rep. of Germany

[73] Assignee: BASF Aktiengesellschaft, Ludwigshafen, Fed. Rep. of Germany

[21] Appl. No.: 404,754

[22] Filed: Sep. 8, 1989

[30] Foreign Application Priority Data

Sep. 27, 1988 [DE] Fed. Rep. of Germany ....... 3832739

[51] Int. Cl.$^5$ .......................................... C07D 311/82
[52] U.S. Cl. .................... 549/227; 549/225; 549/226
[58] Field of Search ................................. 549/226, 227

[56] References Cited

U.S. PATENT DOCUMENTS

| 2,576,293 | 11/1951 | France et al. | 549/227 |
| 3,708,499 | 1/1973 | Andree et al. | 549/227 X |
| 3,767,358 | 10/1973 | Stryker | 549/227 X |
| 3,883,529 | 5/1975 | Austin | 549/227 X |
| 4,165,434 | 8/1979 | Schafer et al. | 549/227 X |
| 4,749,796 | 6/1988 | Sensui et al. | 549/227 X |

FOREIGN PATENT DOCUMENTS

| 2138179 | 2/1973 | Fed. Rep. of Germany | 534/227 |
| 3531272 | 3/1987 | Fed. Rep. of Germany | 534/227 |

Primary Examiner—Floyd D. Higel
Attorney, Agent, or Firm—Oblon, Spivak, McClelland, Maier & Neustadt

[57] ABSTRACT

Salts of esterified rhodamine dyes are prepared in granular form by precipitating the rhodamine dyes with sodium chloride from an aqueous medium containing a water-miscible solvent by adding the sodium chloride at 80°–100° C., which precipitates the dyes in liquid form from the aqueous medium, then stirring the liquid dyes to convert them into a droplet form and then chilling the droplets by direct cooling to below 65° C.

4 Claims, No Drawings

PREPARATION OF RHODAMINE DYES IN GRANULE FORM BY DIRECT COOLING

The present invention relates to a novel process for preparing salts of esterified rhodamine dyes in granule form by precipitating rhodamine dyes with sodium chloride from an aqueous medium which contains a water-miscible solvent by adding the sodium chloride at above 80° C., which precipitates the dyes from the aqueous medium in a liquid state, then stirring them to convert the liquid dyes into a droplet form and then chilling the droplets by direct cooling to below 65° C.

DE-A-3,531,272 discloses the preparation of esterified rhodamine dyes. In the process described therein, the esterification of the corresponding lactone compounds is carried out with dialkyl sulfate among others in ethylene carbonate or propylene carbonate as solvent in the presence of a base. The products obtained are completely esterified rhodamine dyes which in the course of working up, after excess dialkyl sulfate and ethylene carbonate or propylene carbonate have been hydrolyzed in the alkaline medium, are precipitated by the addition of hydrochloric acid and sodium chloride in the form of the respective chlorides.

The hydrochloric acid is added at 90° C., and then the solution is cooled down to 80° C., admixed with sodium chloride and then cooled to below 50° C. in the course of 6–7 hours.

However, the subsequent use of the dyes obtained frequently presents problems since the solid rhodamine dyes thus obtained are not in a low-dusting or dustless form, as desired for reasons of occupational hygiene.

It is an object of the present invention to provide a process whereby the preparation of rhodamine dyes should be possible in a non-dusting form.

We have found that this object is achieved by preparing rhodamine dyes of the formula I

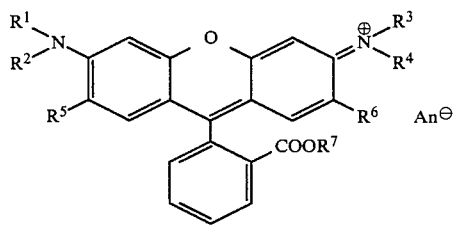

where
$R^1$, $R^3$ and $R^7$ are identical or different and each is independently of the others methyl or ethyl,
$R^2$ and $R^4$ are identical or different and each is independently of the other hydrogen, methyl or ethyl,
$R^5$ and $R^6$ are identical or different and each is independently of the other hydrogen or methyl and
$An^\oplus$ is chloride, methosulfate or ethosulfate,
in granule form by precipitating a rhodamine dye of the formula I where $R^1$, $R^2$, $R^3$, $R^4$, $R^5$, $R^6$ and $R^7$ are each as defined above and $An^\oplus$ is an anion with sodium chloride from an aqueous medium which contains a water-miscible solvent by adding the sodium chloride at 80°–100° C., which precipitates the dye from the aqueous medium in a liquid state, then stirring the liquid dye to convert it into a droplet form and then chilling the droplets by direct cooling to below 65° C.

Suitable water-miscible solvents are for example isobutanol, glycols and etherified glycols, such as ethylene glycol, 1,2-propylene glycol, 1,2-butylene glycol, 1,2-isobutylene glycol, diethylene glycol, triethylene glycol, polyethylene glycols, dipropylene glycol, ethylene glycol monomethyl, monoethyl, monopropyl or monobutyl ether, diethylene glycol monomethyl, monoethyl, monopropyl or monobutyl ether, ethylene carbonate, propylene carbonate, γ-butyrolactone and the mixtures thereof.

The use of ethylene glycol, 1,2-propylene glycol or a mixture thereof as water-miscible solvent is preferred.

In general, from 10 to 100% by weight, preferably from 40 to 80% by weight, of water-miscible solvent is used, each percentage being based on the weight of the rhodamine dye.

The amount of water is in general from 10 to 20 times the weight of the dye.

The amount of sodium chloride which is added is in general from 50 to 200% by weight, based on the weight of the dye. It will ordinarily be so determined that on separation of the rhodamine dyes in granule form the sodium chloride is still in solution.

Water and water-miscible solvent here are in general employed in such amounts that the dye is substantially in solution at 80°–100° C. It is true that increasing the proportion of solvent will increase the solubility of the dye, but then it will also be necessary to increase the amount of sodium chloride required for precipitating the dye. An excessively large amount of solvent, for example an amount three times the weight of the dye, prevents the complete separation of the dye in the liquid state and lowers its solidification temperature.

A certain proportion of the rhodamine dye, for example up to 30 to 40%, may also be present in undissolved, i.e. crystalline, form. This proportion is then wetted in the process according to the present invention by the droplets of liquid dye to form on chilling a granular product wherein the crystals are held together by solidified melt.

If the rhodamine dye of the formula I is to be precipitated as a chloride in granular form, it is advisable to dissolve the dye completely before the sodium chloride is added. Here it can be of advantage to increase the concentration of chloride ions by using hydrochloric acid, in general concentrated hydrochloric acid. In the case of products of technical grade purity, the hot dye solution can be clarified to remove insoluble constituents before the sodium chloride is added.

Suitable rhodamine dyes for preparation in the process according to the present invention as chlorides, methosulfates or ethosulfates in granule form are the abovementioned dyes of the formula I where $An^\oplus$ is an anion. Suitable anions are for example sulfate, hydrogen sulfate, methosulfate, ethosulfate and chloride.

As mentioned above, such dyes are known and described for example in DE-A-1,769,078, DE-A-2,138,179, DE-A-3,531,272 and U.S. Pat. No. 3,767,358.

The starting materials used for the process according to the present invention are in general either the rhodamine dyes mentioned in a solid yet still not dustless form or, however, preferably the reaction solution obtainable by the process described in DE-A-3,531,272.

As mentioned above, in the process described in DE-A-3,531,272 the esterified rhodamine dyes of the formula I are obtained by esterification of the lactones of the formula II

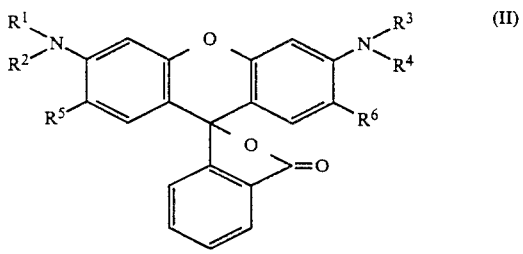

where $R^1$, $R^2$, $R^3$, $R^4$, $R^5$ and $R^6$ are each as defined above, with dialkyl sulfates.

The process according to the present invention is advantageously carried out by heating a mixture of rhodamine dye I, water and a water-miscible solvent with stirring to 80°–100° C. and adding sodium chloride to this mixture (or to the hot reaction solution of dye/methyl ester/methosulfate or /ethyl ester/ethosulfate obtainable as described in DE-A-3,531,272) at 80°–100° C. with or without the prior addition of further water and/or hydrochloric acid. The mixture is then chilled with stirring by direct cooling to below 60° C. and is then allowed to cool down to about 50° C. with stirring, and the granules formed are isolated.

If the dye methosulfates or ethosulfates are not completely dissolved, mixtures are obtained on addition of sodium chloride which contain methosulfate/ethosulfate and chloride as anions.

The rapid lowering of the temperature (chilling) with stirring prevents the droplets from clumping together or from sticking to the walls or from passing into a finely crystalline form. This rapid lowering, however, is industrially not possible sufficiently rapidly by indirect cooling, for example by brine cooling through the vessel walls, since this results in a crystalline product composed predominantly of fine crystals which when dry tend to form a dust. For this reason, chilling is effected in the process according to the present invention by direct cooling, for example by the addition of ice or cold water.

The dye granules obtainable by the process according to the present invention have in the dry form a softening point at above 100° C. The use of a water-miscible solvent in the aqueous medium has the effect of lowering the solidification temperature and of preventing crystallization, which favors the conversion of the solidified droplets into granules on chilling. If the water-miscible solvent is left out, it is not possible to produce granules by chilling the aqueous medium.

The solidification temperature of the liquid dye is about 65° C. and can, as stated above, be affected by the amount of solvent used.

The granules solidified in the aqueous medium are easy to separate off, for example on a suction filter or filter press. Granules are not even harmed by stirring or pumping the suspension. The particle size distribution is within a narrow range, for example about 1–2 mm. Since there are no dusting fines, removal of the granules by centrifuging is particularly advantageous. Another advantage is the low moisture content of the granules (below 40%) after filtration with suction or whizzing. They are therefore also suitable for direct use, for example processing into flexographic printing inks.

The moist granules are advantageously dried at rest, for example in a drying cabinet, on a drying belt or in a tumble dryer. Mechanical comminution in the course of drying is disadvantageous.

The dry granular product, which is in a free-flowing, dimensionally stable and low-dusting granule form, meet all coloristic requirements; even in respect of the color strength there is no weakening. The granular products prepared according to the present invention are equivalent in dusting characteristics to low-dust pulverulent dyes, which are prepared for example by addition of mineral oil in a conventional manner, but they have the advantage that they are free of unwanted foreign substances. Dye powders dustproofed with mineral oil have the disadvantage that they can lead to undesirable oil deposits when used in aqueous medium, for example flexographic printing inks.

The Examples which follow will illustrate the invention in more detail.

EXAMPLE 1

26 g of a dye of the formula

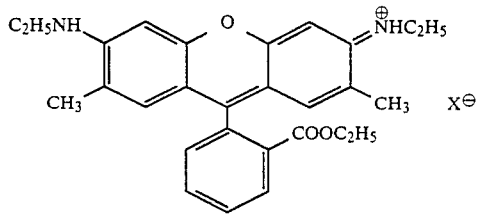

(where $X^\oplus = C_2H_5OSO_3^\oplus$) in powder form were dissolved in 640 ml of water with stirring at 90°–93° C. 9 g of 1,2-propylene glycol, 6.5 g of concentrated hydrochloric acid and 23 g of sodium chloride were then added. The mixture was stirred at 90°–93° C. for 10 minutes, during which the dye became precipitated in the form of drops of liquid, and 90 g of ice were then added. The temperature dropped to 70° C., and small spheres, approximately half pinhead size, formed. Stirring was continued while the temperature decreased to about 60° C., and the spheres solidified and were then filtered off with suction. After sucking to dryness the filter cake had a water content of about 20% by weight.

After drying in a through-circulation cabinet at 80° C., 21 g of the abovementioned dye (where $X^\oplus = Cl^\ominus$) were obtained in the form of free-flowing, virtually dustless granules.

EXAMPLE 2

40 g of the dye of the formula

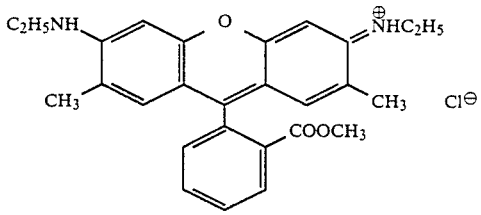

in powder form were dissolved in 640 ml of water with the addition of 14 ml of concentrated hydrochloric acid and 16 g of 1,2-propylene glycol by heating and stirring at 92° C. 35 g of sodium chloride were then added rapidly, the batch was stirred for 4 minutes, during which the dye became precipitated as a resin in droplet form, and 100 g of ice were then added with stirring. The temperature decreased to 65° C. in the course of 5 minutes, and the droplets solidified as granules approximately the size of a pinhead. Stirring was continued for a further 5 minutes, and the granules were then isolated on a suction filter. The water content of the filter cake was about 18%.

Drying at 80° C. left 40 g of the abovementioned dye as a free-flowing, virtually dustless granular product.

EXAMPLE 3

In a stirred vessel, 471 g of a mixture of ethylene carbonate and propylene carbonate (1:1 v/v) were stirred with 33 g of magnesium oxide for 10 minutes without exceeding 30° C. The stirrer was then switched off, and 774 g of Rhodamine 2C base were added. 270 g of dimethyl sulfate (98% strength by weight) were added, the mixture was stirred for 10 minutes. It was then gradually heated to 80° C. Thereafter, the internal temperature rose as a consequence of the exothermic reaction without heat supply to about 105°–120° C. After an internal temperature of 105° C. had been reached, the mixture was stirred at 110°–120° C. for a further hour, when the esterification had ended.

1500 ml of cold water were then added with stirring, and the mixture was subsequently stirred for 15 minutes. A temperature of about 60° C. became established, the pH being at about 7.

A further vessel was charged with 2000 ml of cold water, and 67.5 g of 50% strength by weight sodium hydroxide solution were added with stirring, followed by the contents of the stirred vessel. A temperature of about 35° C. became established. To hydrolyze the ethylene carbonate and propylene carbonate, the mixture was subsequently stirred for one hour and then brought with 80 ml of sulfuric acid (76% strength by weight) to pH 4.5–4.0. After the acid had been added, the contents were heated to about 95° C. in order to dissolve the dye completely.

The mixture was clarified to remove small amounts of impurities. The filtrate was heated to 90° C., 257 ml of concentrated hydrochloric acid were added, and the mixture was subsequently stirred for about 30 minutes. 450 g of sodium chloride were then added, the mixture was stirred for a further 30 minutes, during which the dye became precipitated as a resin in droplet form, and 1800 g of ice were added. The temperature fell to about 60° C., and the droplets became solid in granule form. The mixture was subsequently stirred for 30 minutes and the granules were isolated by filtration with suction. Drying at 80° C. left the dye (chloride) in the form of a free-flowing, virtually dustless granular product.

EXAMPLE 4

A stirred vessel was charged with 645 g of a 1:1 v/v mixture of ethylene carbonate and propylene carbonate, and 30 g of magnesium oxide were added with stirring without exceeding 30° C. 1290 g of Rhodamine 2C base and 550 g of diethyl sulfate (98% strength by weight) were then added. The batch was heated with stirring to the onset of an exothermic reaction, and the internal temperature was allowed to rise to 130° C. 1000 ml of cold water were added after one hour of stirring at 120° C., and the batch was subsequently stirred at 80° C. for 15 minutes to hydrolyze the remaining ethylene carbonate and propylene carbonate.

A further vessel was charged with 5000 ml of water at a temperature of 80° C., followed by the contents of the stirred vessel with stirring, and 1000 g of sodium chloride were added, the dye becoming precipitated as a resin in droplet form. 1500 g of ice were then added, and the batch was cooled down to 60° C., the droplets forming solid granules. The batch was subsequently stirred for 30 minutes, the granules were isolated by filtration with suction. The drying at 80° C. left the dye in the form of a free-flowing, virtually dustless granular product comprising a mixture of chloride and ethosulfate.

I claim:

1. A process for preparing a rhodamine dye of the formula I

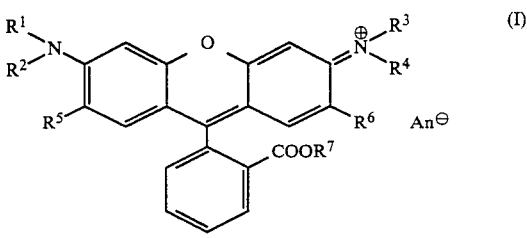

where
    $R^1$, $R^3$ and $R^7$ are identical or different and each is independently of the others methyl or ethyl,
    $R^2$ and $R^4$ are identical or different and each is independently of the other hydrogen, methyl or ethyl,
    $R^5$ and $R^6$ are identical or different and each is independently of the other hydrogen or methyl and
    $An^\oplus$ is chloride, methosulfate or ethosulfate, in granule form by precipitating a rhodamine dye of the formula I where $R^1$, $R^2$, $R^3$, $R^4$, $R^5$, $R^6$ and $R^7$ are each as defined above and $An^\oplus$ is an anion with sodium chloride from an aqueous medium which contains a water-miscible solvent, which comprises adding the sodium chloride at 80°–100° C., which precipitates the dye from the aqueous medium in a liquid state, then stirring the liquid dye to convert it into a droplet form and then chilling the droplets by direct cooling to below 65° C.

2. The process of claim 1, wherein said chilling is preformed by adding ice or cold water to said stirred medium.

3. The process of claim 1, wherein said granule form has a softening point at above 100° C.

4. The process of claim 1, wherein said granule form has a particle size distribution of about 1–2 mm.

* * * * *